United States Patent [19]

Parker

[11] Patent Number: 4,845,620

[45] Date of Patent: Jul. 4, 1989

[54] CONTROL ARRANGEMENT FOR VEHICLE MEMORY SEAT

[75] Inventor: David A. Parker, Westland, Mich.

[73] Assignee: United Technologies Automotive, Inc., Dearborn, Mich.

[21] Appl. No.: 136,800

[22] Filed: Dec. 22, 1987

[51] Int. Cl.[4] .......................... B60N 1/02; G06F 15/20
[52] U.S. Cl. ............................... 364/424.05; 318/466; 318/568.1; 296/65.1
[58] Field of Search .................... 364/424.05; 318/466, 318/467, 468, 568; 296/65.1; 307/10 R

[56] References Cited

U.S. PATENT DOCUMENTS

| 4,204,255 | 5/1980 | Cremer | 364/424.05 |
|---|---|---|---|
| 4,264,849 | 4/1981 | Fleischer et al. | 318/568 |
| 4,267,494 | 5/1981 | Matsuoka et al. | 318/568 |
| 4,404,632 | 9/1983 | Harada et al. | 364/424.05 |
| 4,434,468 | 2/1984 | Caddick et al. | 364/424.05 |
| 4,451,887 | 5/1984 | Harada et al. | 364/424.05 |
| 4,510,426 | 4/1985 | Michaels et al. | 318/565 |
| 4,661,752 | 4/1987 | Nishikawa et al. | 364/424.05 |
| 4,706,194 | 11/1987 | Webb et al. | 364/424.05 |

Primary Examiner—Gary Chin

[57] ABSTRACT

A control capable of moving a powered seat bidirectionally along at least one travel path includes memory having a segment for storing the present position of the seat and segment(s) for storing one or more "memory" or "recall" positions to which the seat may be automatically directed via appropriate switch actuation and associated logic. The memory is of limited capacity, with a memory segment of less than 2N capacity being utilized for storing the present position data associated with an axis or path of travel. Similar limitations in capacity preferably apply to the memory segments associated with the storage of respective "recall" positions. The value N is equal to the number of digital signals produced by a displacement sensor during the driven displacement of the seat through the full extent of its travel path in one direction. Compensating means respond to the count in the present position memory reaching a limit for appropriately incrementing or decrementing the count(s) representative of the respective "recall" positions for maintaining an accurate relation between the stored count data. This arrangement permits the counts in the several memory segments to be initially set to a mid-position, regardless of the actual positioning of the seat. The compensation may be done in hardware with an overflow register or in software by real-time adjustment of the count.

9 Claims, 7 Drawing Sheets

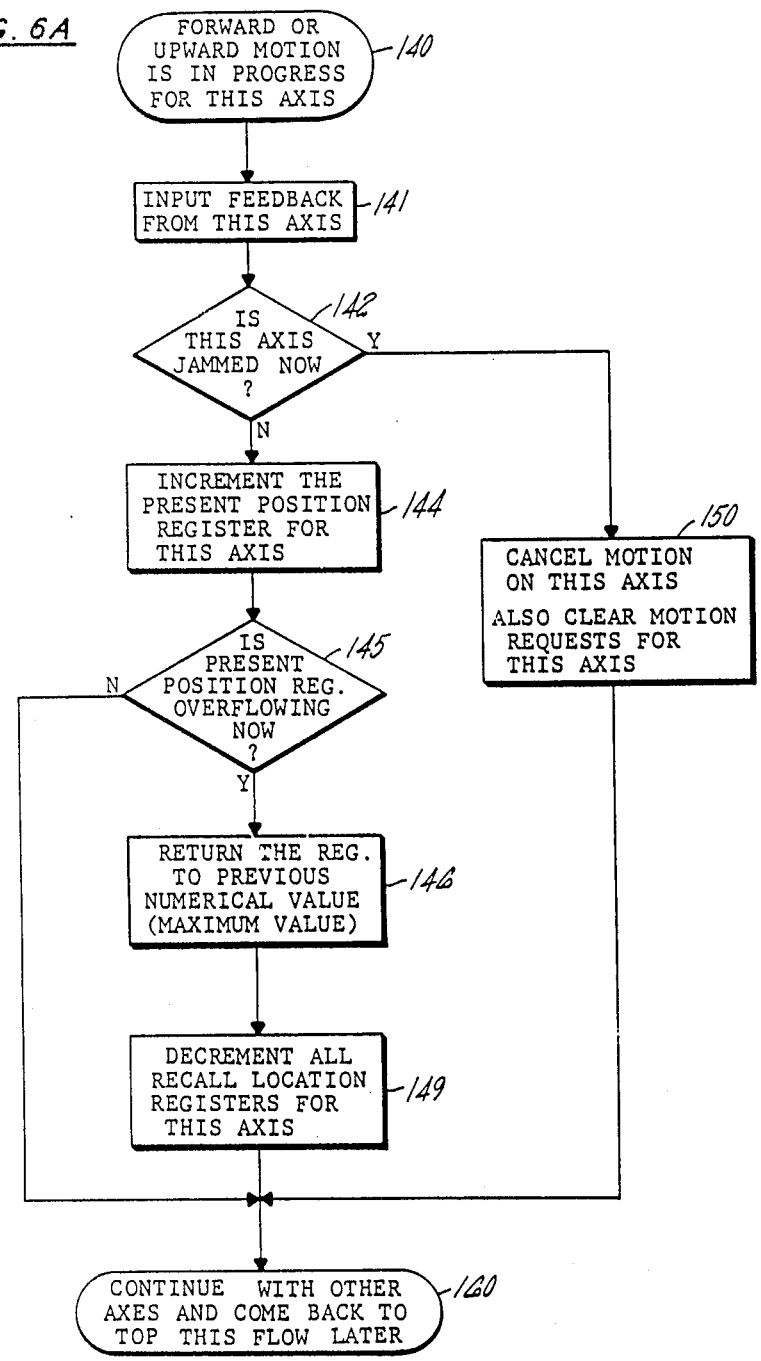

4,845,620

CONTROL ARRANGEMENT FOR VEHICLE MEMORY SEAT

DESCRIPTION

1. Technical Field

The invention relates to a control system for a seat and more specifically to a particular control configuration for a memory seat associated with a vehicle, such as an automobile or the like.

2. Background Art

In the provision of various utility and safety equipment within present day vehicles having a so-called "memory" capability, the device is typically capable of being automatically directed to a selected one of one or more preselected memory positions. While such memory capability has been provided, for example, for both internal and external mirrors associated with vehicles, probably its most frequent utilization is associated with the seats in such a vehicle. Memory seats are driven by one or more electrical motors in a reversible direction, along or about one or more respective paths or axes. In most such systems, at least the driver's seat and typically also the front passenger seat are provided with respective memory capability. Moreover, each seat possessing such memory capability is capable of storing at least one preselected "target", "memory" or "recall" position and typically includes two such "recall" positions and sometimes more. Examples of such memory seat controllers may be found in U.S. Pat. Nos. 4,434,468 to Caddick et al; 4,510,426 to Michaels et al; and 4,706,194 to Webb et al, the latter patent being assigned to the owner of the present application and being incorporated herein by reference to the extent consistent herewith.

In some memory seat control systems, particularly earlier ones, it was common to provide an indication of the present position of the seat via some type of analogue control signal, as for instance, provided by a continuously variable potentiometer or a linear voltage differential transformer. In such instance, the instantaneous signal level was representative of the actual seat position and a stored recall position would be characterized by either a stored or generated particular reference voltage level.

More recently, as typified by the aforementioned patents, the sensing and control function has relied upon the input of digital signals, representative of incremental displacement, to a digital processor or controller. In such instance, a sensor, as for instance, a Hall-effect sensor, is positioned with respect to some moving portion of the seat assembly such that increments of displacement result in the production of the respective digital pulses. These pulses are then counted to provide an indication of the magnitude of the displacement. Correspondingly, specific positions are identified or determined by a particular pulse count. It is to this digital-type of memory seat controller that the present invention applies.

For reasons of safety and dependability, it is a typical requirement of vehicle manufacturers that a provision be made within the memory seat controller to prevent unintended automatic motion of the seat, particularly at a time when electrical power is initially applied to the controller or is reapplied following disconnection from the source battery. While these events typically only occur at the time of battery hook-up during vehicle assembly and upon replacement of the battery in the vehicle, it is important to prevent unintended motion of the seat resulting from a disparity between the data representative of the seat's present position and that data appearing in the "recall" memory representative of a target position. Accordingly, there has been a requirement that at such infrequent instances of power-up of the controller, the "present position" and the "recall position(s)" be identical to prevent the unwanted motion which would result if they were different and/or that a status bit be set which does not allow a recall position to be selected until the memory containing the recall position(s) has been manually set.

One manner of accomplishing such initialization might involve the prepositioning of the seat at some limit position with respect to each of the axes along or about which it is displaceable to establish a known "zeroed" position and to similarly initialize or "zero" the associated recall memories. In such instance, it would only be necessary that each memory associated with the respective present position or respective recall positions have a capacity which accommodates the maximum number of pulses which may be generated in traversing the seat from one limit to the opposite limit on that axis. The number of pulses normally expected to be generated as a particular seat design traverses the extent of an operational axis may be designated N and may be typically be 100–1,000 pulses, depending on size and resolution. Since drive mechanisms may vary from seat to seat, it is normally prudent to provide additional capacity somewhat beyond the nominal value of N.

In a system disclosed in the U.S. Pat. No. 4,434,468 to Caddick et al, the memory capacity of the present position counter was configured to have at least twice as many memory locations (at least 2N) as the maximum number of pulses representing the full travel path of a motor. The recall buffers or memories are then initialized to the numeric center positions of the memories with disregard for the initial positions of the seat adjustment mechanism. Since the various buffer memories, including the present position memory and the one or more "destination" (i.e. recall) memories each have a capability of more than double the number of possible motor positions (i.e., greater than 2N), a full traverse of any motor drive is then possible without memory overflow.

The aforementioned memory seat control configurations, while potentially effective, do possess certain limitations. For instance, in the configuration having memories of substantially N-count capacity, it would be necessary to initialize the system by manually driving the seat to a known limit position in order to prevent overflow of the memory when thereafter traversing the full extent of the motor drive. On the other hand, in the control configuration associated with the Caddick et al patent, although the provision of the various buffer memories having respective capacities for storing at least 2N digital signals does negate the need to physically initialize the seat at some reference limit position, it requires the additional complexity, capacity and cost associated with the respective memories each requiring a capacity greater than 2N.

DISCLOSURE OF THE INVENTION

It is a principal object of the present invention to provide an improved control for the positioning of a vehicle seat within a powered seat mechanism, which control includes a memory capacity. Included within this object is the provision of a controller which is relatively economical with respect to memory capacity yet which also obviates the need for manual initialization of the seat mechanism.

It is a further object of the present invention to provide an improved memory seat controller in which the count capacity of the respective memories is preferably less than 2N.

It is a further object of the present invention to provide an improved memory seat controller for which the limit positions are determined adaptively.

According to the invention there is provided an improved apparatus for controlling the positioning of a vehicle seat in a powered memory-seat mechanism. The control apparatus includes a reversible motor operative to drive the seat in either of two opposite directions within a travel path of limited extent, means for producing digital signals during operation of the motor representative of the position of the seat within the travel path and logic and signal storage means. The signal storage means includes at least first and second memories, the first memory being receptive of the digital signals for storing therein data representative of the present position of the seat within the travel path. The controller further includes manually selective position control means for setting the second memory to store data representative of a recall position within the travel path for a seat. The controller further includes position recall means which are manually actuatable to signal the logic and storage means to initiate operation of the motor to drive the seat toward the recall position. The means for producing the digital signals is operative during operation of the motor to produce signals for transmission to the memory means to control the drive of the seat to the recall position. The improvement comprises structuring the memory means to be of limited capacity, with at least the first memory being of less capacity than is required for storing 2N digital signals, where N is equal to the number of digital signals produced during the drive of the seat through the extent of the travel path in one direction. Further, compensating means appropriately decrement or increment the data representative of a recall position in respose to the first memory reaching a capacity limit, for maintaining an accurate relation between the data respectively representative of the actual position and the recall position of the seat.

In one embodiment, the compensating means may comprise overflow/underflow register means for accumulating a respective count of the digital signals which exceed the respective overflow or underflow capacity limit of the first memory and means for respectively decrementing or incrementing the recall position data by the count accumulated by the overflow/underflow register means. In another embodiment, the compensating means involves the logic means being responsive to the first memory attaining a respective capacity limit and respectively decrementing the recall position data upon each count by which subsequent digital signals overflow the capacity limit or incrementing the recall position data upon each count by which subsequent digital signals underflow the capacity limit.

Further, the controller preferably includes a third memory, the second and third memories being for first and second recall position data respectively. The first and second recall position data are respectively associated with first and second personal preference positions. Both the first recall position data and the second recall position data are decremented or incremented for each count by which the digital signals respectively overflow or underflow the capacity limit of the first memory. The controller further includes means for automatically initializing the memory means for the present position data and for the recall position data at their respective numeric center positions upon power-up of the logic and the signal storage means.

The memory and the control program may also make provision for an "ease of entry" function which, after determining and storing the limits of seat travel which provide the greatest space for access, allows recall and automatic movement of the seat to that position.

BRIEF DESCRIPTION OF THE DRAWINGS

FIGS. 6A and 6B are partial firmware flow diagrams depicting the use of memory register adjustment for conditions of overflow/underflow in controlling motion of the seat in respectively opposite directions in accordance with another embodiment of the invention.

BEST MODE FOR CARRYING OUT THE INVENTION

Figure 1A:
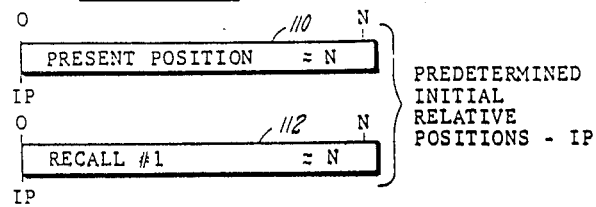
FIGS. 1A and 1B diagrammatically depict memory capacities and relative memory "positions" in accordance with first and second embodiments respectively of prior art memory seat controls.
Figure 1B:
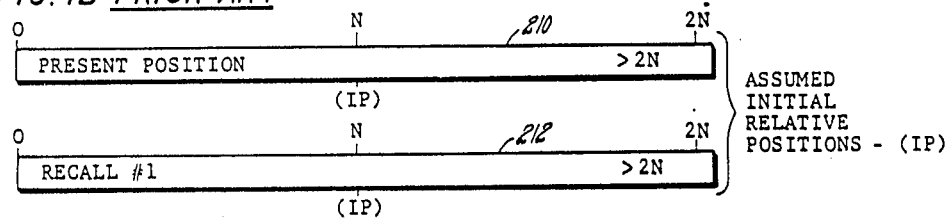

Referring to the Figures, and particularly to FIGS. 1A and 1B, there are depicted two arrangements in accordance with the prior art for storing digital data representative of the current or present position of a seat drive mechanism and representative of a memory or recall position of the seat drive mechanism. In FIG. 1A, there is diagrammatically depicted a Present Position memory 110 having a capacity of at least about N, where N is equal to the number of digital signals produced during the drive of the associated seat (not shown) through the extent of its travel path in one direction. A second memory designated the Recall #1 memory 112 is also depicted and similarly has a capacity of at least about N digital signals. The buffers or memories 110 and 112 are typically associated with a microprocessor or microcomputer which provides the control for the memory seat function.

The capacities and configuration of the memory embodiment of FIG. 1A are comparable to the first example mentioned earlier in the Background section of this application. In that example, the predetermined initial relative positions IP between the data in the Present Position memory 110 and the Recall #1 memory 112 are known or predetermined because the seat is manually "driven" to a known limit position at one end or the other of that particular "axis" or path along which the mechanical system of the seat is displaced. By that method of establishing the initial position (IP) of the Present Position memory 110 as being at a known limit position of the respective memory, the total capacity of that memory need only be N, or perhaps N plus some small additional capacity to allow for manufacturing tolerances. Similarly, the capacity of the Recall #1 memory 112 need only be about N. However, it is evident that human involvement is normally required to drive the seat to the limit positions(s) along or about its several paths of motion, though some automatic process might be used if the bounds of safety permit.

Referring to FIG. 1B which depicts a second configuration of memories in accordance with the prior art, there is depicted a Present Position memory 210 having a capacity greater than 2N (i.e., >2N) and a Recall #1 memory 212 also having a capacity of at least 2N. This figure depicts the memory configuration described in the aforementioned U.S. Pat. No. 4,434,468 discussed earlier in the present application. In that instance, it is intended not to have to perform a manual initializing operation of the seat mechanism, yet it is still desired to provide adequate memory capacity to prevent overflow or underflow from a starting position arbitrarily selected to be in the middle of that memory. Unlike the embodiment of FIG. 1A in which the initial position IP of the seat is determined by driving it to a limit position, in the embodiment of FIG. 1B the memories 210 and 212 are each initialized to their mid-positions which has a count at or slightly greater than N and is represented by the parenthetical expression (IP). Since the remaining capacity of a memory 210 or 212 in either direction from the initial position (IP) is at least N, a full traverse of any motor and seat drive is then possible without overflowing the respective memory. While this arrangement overcomes some of the objections of the embodiment of FIG. 1A, it does require the expanded memory capacities of at least 2N per memory.

Figure 2:
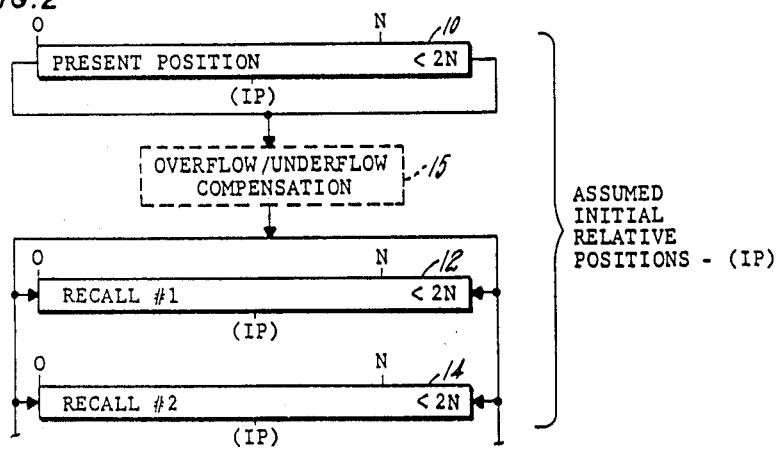
FIG. 2 is a diagrammatic representation of the relative memory capacities and "positions" in accordance with the memory seat control system of the present invention.

Referring to FIG. 2, there is depicted a configuration of memories in accordance with the present invention. The memories, as with the prior art, are an included portion of the microcomputers which provide the control for the memory seat drive mechanism. FIG. 2 depicts a Present Position memory 10 having a capacity clearly less than 2N (<2N), and typically being only slightly greater than N, as for instance 1.25N. Similarly, this embodiment includes a Recall #1 memory 12 of similar capacity to that of memory 10. As in most other memory seat control systems associated with the prior art, there is also provided a further Recall #2 memory 14 in which data representative of a desired seat position for a second person may be stored. Thus, the Recall #1 and 2 memories 12 and 14, respectively may be associated with person A and person B, or "him" and "her", or driver 1 and driver 2 or, for that matter, passenger 1 and passenger 2.

Importantly in accordance with the invention as depicted in the memory configuration of FIG. 2, since it may be preferable not to have to manually drive the seat to a limit position as was done in the embodiment of FIG. 1A, some arbitrary presumed positioning of the seat will be required. As in the prior art example of FIG. 1B, the control system memories are initialized at or near their mid-points, as represented by the parenthetical expressions (IP). By establishing the initial positions (IP) to each be at the same location in the respective memories 10, 12 and 14, the possibility of unintended seat motion during assembly, testing or initial operation is avoided since no disparity between the present position and the two Recall positions #1 and #2 initially exist. However, it will be noted that since the capacity of each memory 10, 12 and 14 is <2N, there exists the possibility that at some time during one of the subsequent operations of the seat toward a limit position, the limit of the memory will be reached prior to reaching the physical limit of the mechanical system.

Therefore, in accordance with the present invention, provision has been made for compensating for the limited capacity of the Present Position memory 10 and the Recall memories 12 and 14. In FIG. 2, that capability has been represented very functionally and generally by the block designated "Overflow Compensation" 15 shown responding to the ends of the Present Position memory 10. The Overflow Compensation means 15 may be provided in one embodiment by limited additional memory capacity or, in an alternate embodiment simply, by appropriate programming of the memory control, yet in either instance reduces the requirement of memory capacity relative to that of the FIG. 1B embodiment.

Figure 3:
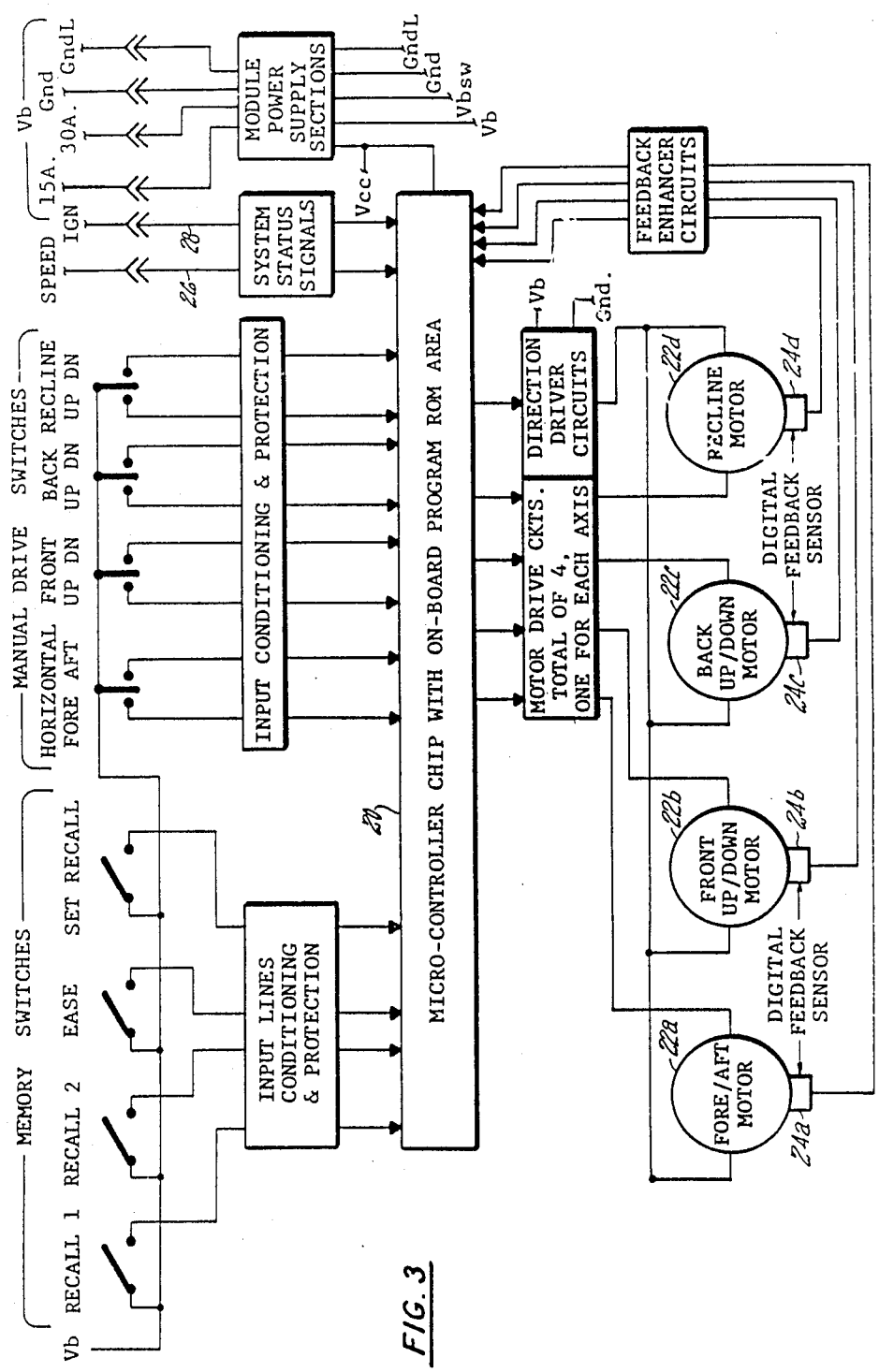
FIG. 3 is a generalized schematic block diagram of the memory seat control system of the present invention.
Figure 4:
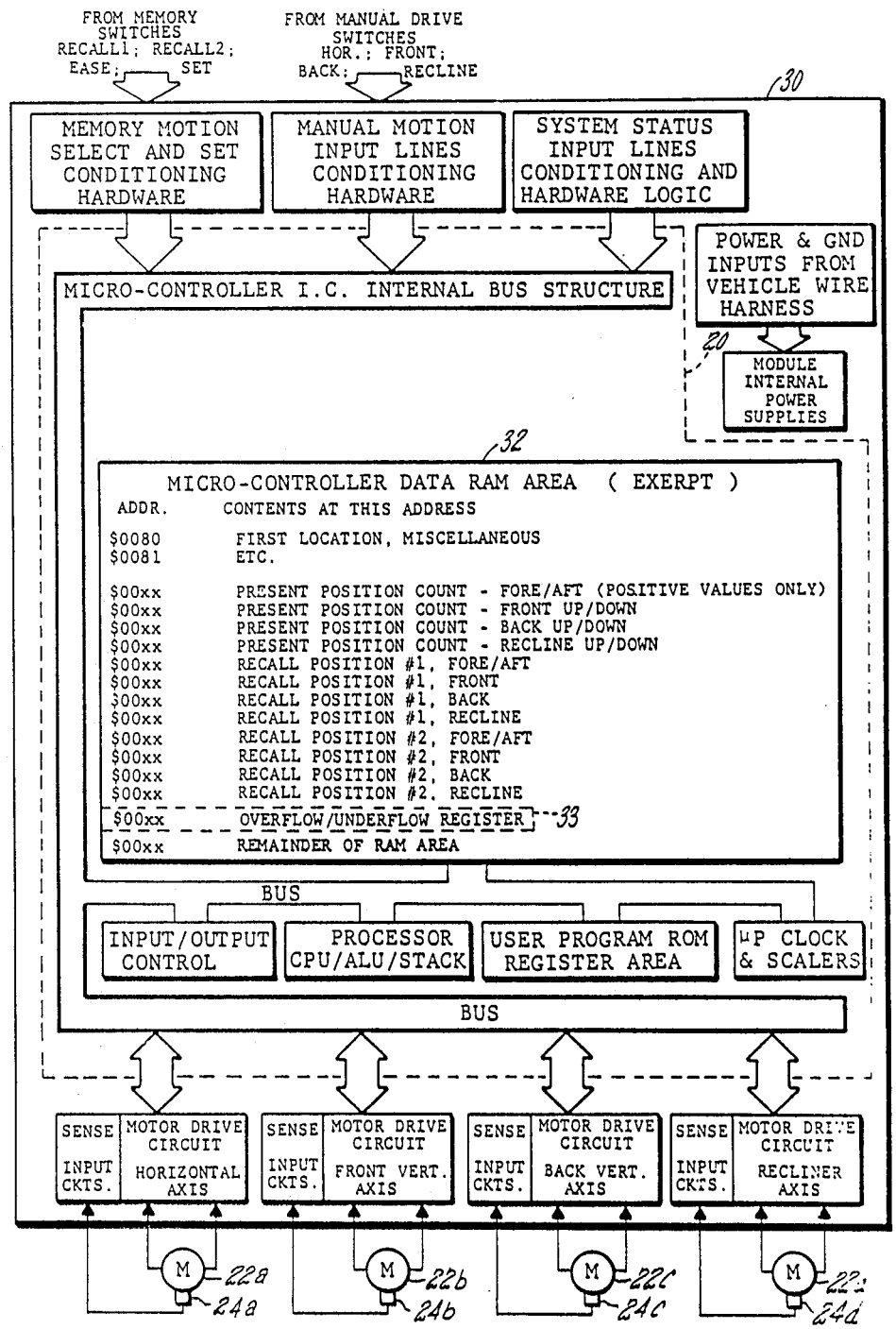
FIG. 4 is a diagrammatic functional block diagram of the memory seat control system, illustrating the microcomputer architecture in greater detail.

Before describing the improved control of the memories of FIG. 2 in greater detail, it will be beneficial to undertake a brief discussion of the memory seat control system as depicted in FIGS. 3 and 4. Referring first to FIG. 3, a microcomputer or controller 20 receives control inputs from a group of manual seat position switches mounted, for example, on the console and designated HORIZONTAL, FORE-AFT; FRONT, UP-DOWN; BACK, UP-DOWN and RECLINE, UP-DOWN. Controller 20 similarly receives control inputs from an array of memory switches designated RECALL 1; RECALL 2; EASE and SET RECALL. The controller 20 provides output drive control signals to four motors each associated with a drive mechanism respectively associated with a respective axis or path of seat motion. The motors include Fore-Aft motor 22a; Front, Up/Down motor 22b; Back, Up/Down motor 22c and Recline motor 22d. It will be noted that each of these motors is associated with one of the manual control input switches.

Motor 22a is connected to a drive mechanism for effecting fore and aft motion of the seat (not shown) horizontally in a conventional manner. Motor 22b similarly is associated with a mechanism for moving the forward end of the seat up and down. Motor 22c is associated with a mechanism for moving the back of the seat up and down. The Recline motor 22d is associated with a mechanism for moving the seat-back up or down (i.e. forward and back) about a horizontal axis.

Associated with each of the drive mechanisms, typically at the respective motors 22a-22d, is a respective sensor 24a-24d for sensing displacement of the motor and/or drive mechanism and providing a digital indication thereof. One suitable and conventional such sensor is a Hall effect device which is responsive to relative motion between it and another member for generating a digital pulse associated with the passing of that member. Conveniently, such pulse generating members may be placed in a known manner on the seat drive mechanism, as for instance on the shaft of a respective drive motor. Operation of a particular drive mechanism results in the generation of digital pulses by the associated sensors 24a-d, the quantity of such pulses being indicative of the magnitude of the attendant displacement.

The microcomputer or controller 20 is preferably a single integrated chip microcomputer such as the Hitachi HD6305V0PJ. The microcomputer 20 includes a central processing unit (CPU), a clock, a read only memory (ROM) for the associated program, a random access memory (RAM) and conventional input/output control circuitry. It is the RAM portion of the microcomputer 20 as well as the programming stored in ROM which provide the improved memory means and the compensation therefor in accordance with the present invention.

Vehicle speed and the state of the vehicle's ignition, (i.e. "ON" or "OFF") are extended to the microcomputer 20 via leads 26 and 28, respectively to limit response of the memory seat control system to certain predetermined vehicle operating bounds stored within the controller 20.

Briefly referring to FIG. 4, there is depicted, in very general block diagram form, the centralized control circuitry 30 exclusive of the aforementioned input control switches and generally showing the motors 22a–22d and the digital feedback sensors 24a–24d associated therewith. More specifically, the functional blocks of the microcomputer 20 are generally depicted with a portion 32 of the RAM area having been exploded to depict the specific inclusion of the various memory locations relevant to a further discussion of the invention. Each memory address is representative of a dedicated area of the RAM having a respective capacity for storing approximately N or preferably 1.25N counts, but clearly less than 2N counts. Depicted in the excerpts 32 of the RAM are the four Present Position count memories and the eight Recall Position memories for the Recall #1 and Recall #2 positions. Also depicted in excerpt 32, within the broken line designated 33, is at least one memory or register location for overflow/underflow in accordance with one embodiment of the invention.

Although the inventive memory configuration as depicted in FIG. 2 only depicts a single Present Position memory 10 and respective Recall #1 memory 12 and Recall #2 memory 14, it will be understood from a review of FIGS. 3 and 4 that the invention is applicable to memory seat control systems in which motion of the seat is provided along not only one, but more than one paths. In the illustrated embodiment, bidirectional displacement of the seat is possible along four paths or axes, to wit, fore and aft in a horizontal direction, up and down at the front of the seat, up and down at the back of the seat, and up and down (forward and back) motion of the recliner about its horizontal axis. Thus, if it is intended for one seat to offer two so-called memory or recall positions, 12 memories or registers each having the requisite capacity are required Referring now to a more detailed description of a first embodiment of the invention, described in connection with FIGS. 2, 5A and 5B, the overflow/underflow compensating means 15 of FIG. 2 may be provided by a specific overflow/underflow register or memory provided in the RAM of microcomputer 20 as represented in broken line 33 in FIG. 4. The overflow/underflow register of compensating means 15 will have a capacity that is at least sufficient to accumulate and temporarily store the maximum overflow or underflow count possible. In the memory capacity configuration described with respect to FIG. 2, if the Present Position memory 10 is presumed to have a capacity only slightly greater than N and is initialized at its mid-position, it is possible that the associated seat might in fact be positioned very near one or the other of its limits of travel along a respective axis. In such instance, if the seat is driven in the opposite direction away from that limit, the Present Position memory 10 will overflow (or underflow) when only a few more than $\frac{1}{2}N$ counts have occurred. Accordingly, the overflow/underflow register of compensating means 15 requires a capacity of at least about $\frac{1}{2}N$. If two or more axes or paths of motion may be active at the same moment, then the overflow/underflow memory capability must be increased accordingly.

In conventional operation, assuming the Present Position memory 10, the Recall #1 memory 12 and the Recall #2 memory 14 for each of the respective paths of motion have been initialized at its center position (IP) and further assuming that the seat is in fact at any random position within the respective path, it is then possible to manually drive the seat via the manual motion switches to some desired position which may become Recall #1. While the seat is being moved, the Present Position memory 10 is being appropriately incremented or decremented. When the desired position for a Recall #1 setting is achieved, the Present Position value is stored in Recall #1 memory 12 by actuating the SET switch and the RECALL #1 switch in a known manner. The establishment of the Recall #2 position is obtained in a similar known manner. It will be appreciated that the foregoing process is used to identify the Recall #1 and Recall #2 positions for each of the several paths of travel.

However, in the present embodiment it will be evident that if the target position to be set in either or both of the Recall #1 and Recall #2 memories 12 and 14, respectively are beyond the N or 1.25N capacity of the memories 10-14, an overflow or underflow will occur and the reference which the Present Position memory 10 is capable of providing relative to the Recall #1 and Recall #2 memories 12, and 14 may be lost. Therefore, in accordance with the invention the condition of memory overflow or underflow is monitored with respect to the Present Position memory 10 and any corresponding overflow or underflow count is accumulated in the overflow/underflow compensation register 15. When such manually-controlled driving of the seat to a desired position ceases, the counts in the Recall #1 and Recall #2 memories 12 and 14 are respectively decremented or incremented by the amount of the count in overflow/underflow register 15. Thus, assuming each of the memories 10, 12 and 14 had a capacity of 1,000 counts and started from an initial position (IP) of 500, if the seat was moved forward 600 counts, the Present Position memory 10 would show a count of 1,000, with an overflow count of 100 in the overflow register 15. Correspondingly, the Recall #1 and Recall #2 memories 12 and 14, which would have remained at 500 during the motion of the seat, will immediately be adjusted to a count of 400 when motion of the seat drive mechanism stops. Thereafter, if it is desired to establish this positioning of the seat as the Recall #1 position, the Recall #1 switch and the SET switch are concurrently actuated, and the Present Position value of 1,000 in memory 10 is also entered as the count in Recall #1 memory 12.

Thereafter, if it is assumed that the desired positioning of the seat for Recall #2 position is even farther forward than that of Recall #1, the seat may be manually driven forward an additional distance of, for instance, 50 counts. During that additional drive of the horizontal seat motor and the seat, the Present Position memory 10 will overflow by that count of 50, however, the compensating register 15 which will have been previously reset, will serve to store that count of 50. Once the motor and seat stop movement, a count of 50 is decremented from the counts then presently stored in the Recall #1 and Recall #2 memories 12 and 14. In such instance, the new count in Recall #1 memory 12 will be 950 and the count in Recall #2 memory 14 will be decremented from 400 to 350. Thereafter the Recall #2 and the SET switches may be concurrently actuated to store the appropriate Present Position count in the Recall #2 memory. At that instant the Present Position count from memory 10 will be 1,000 and will be entered in the Recall #2 memory 14, such that the Present Position count will be 1,000, the Recall #1 stored count will be 950, and the Recall #2 stored count will be 1,000. This establishes the correct relationship between the positions stored in the Recall #1 and the Recall #2 memories 12 and 14 and also places them in correct perspective with the Present Position of the seat as represented by the count stored in the present position memory 10.

Although the foregoing example was for a situation in which the seat was initially well to the rear of the presumed mid-position and the desired Recall #1 and Recall #2 positionings were more than 500 counts forward of that mid-position, as evidenced by its ability to be moved forward at least 650 counts from its starting position, the system is equally effective to compensate for offsets of the presumed position in the opposite direction. Moreover, while the cited example was limited to the memories associated with a single path of motion, it will be appreciated that the structure and process repeat for each additional path of motion of the seat. In this latter instance, the overflow/underflow compensating memory 15 must be capable of separately accumulating the overflow/underflow counts for each path of motion which may be concurrently energized.

In the illustrated embodiment, two control criteria apply. Firstly, motion in an upward and/or forward direction occurs separately in time from motion in a rearward and/or downward direction, and secondly, no more than two paths of motion may be energized at any one time. Accordingly, overflow/ underflow compensation register capacity for two separate paths of motion is required. This may be provided by a part of "½N" count registers, each as represented as 33 in FIG. 4.

Figure 5A:
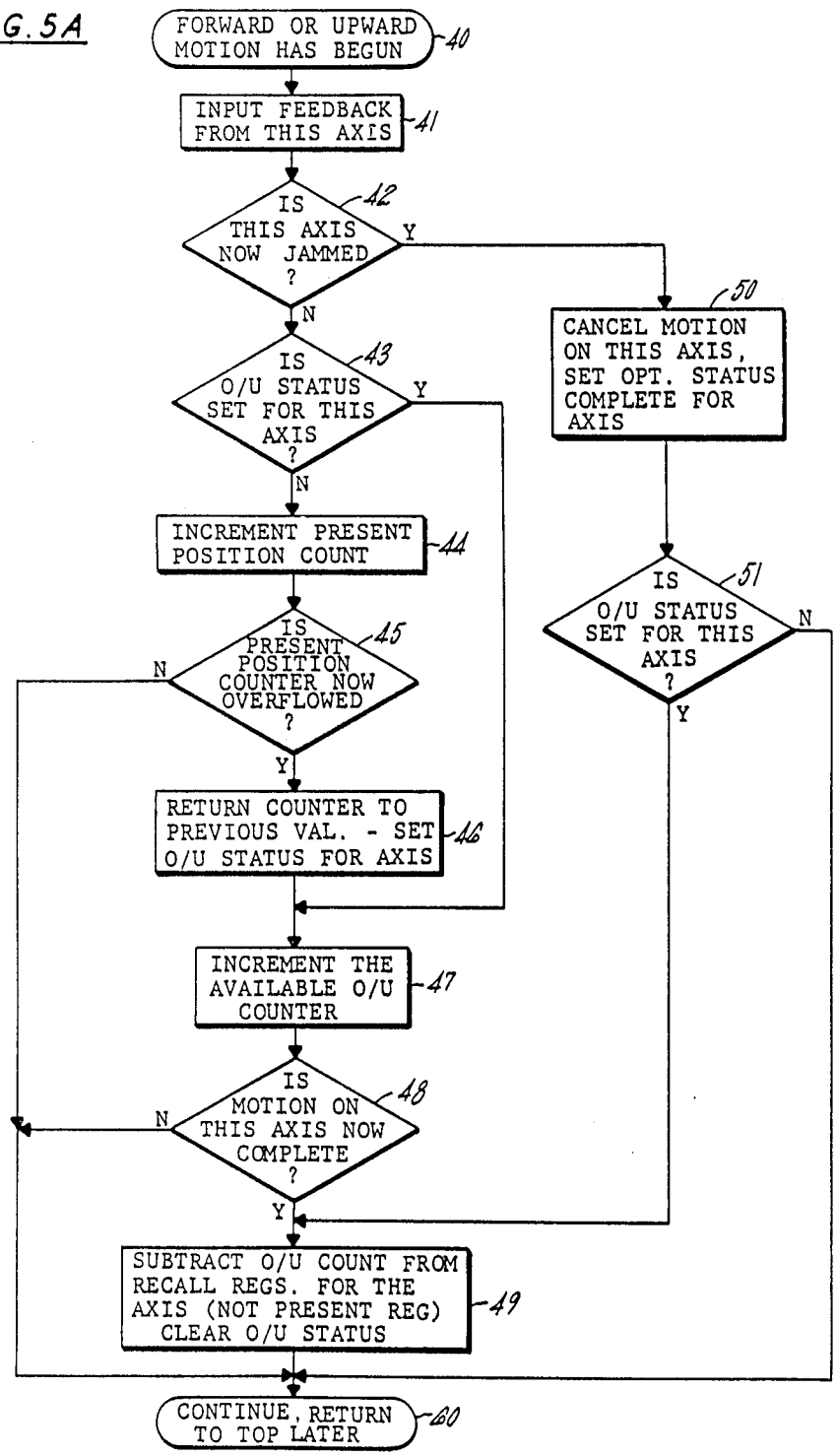
FIGS. 5A and 5B are partial firmware flow diagrams depicting the use of overflow/underflow registers in controlling motion of the seat in respectively opposite directions in accordance with one embodiment of the invention.
Figure 5B:
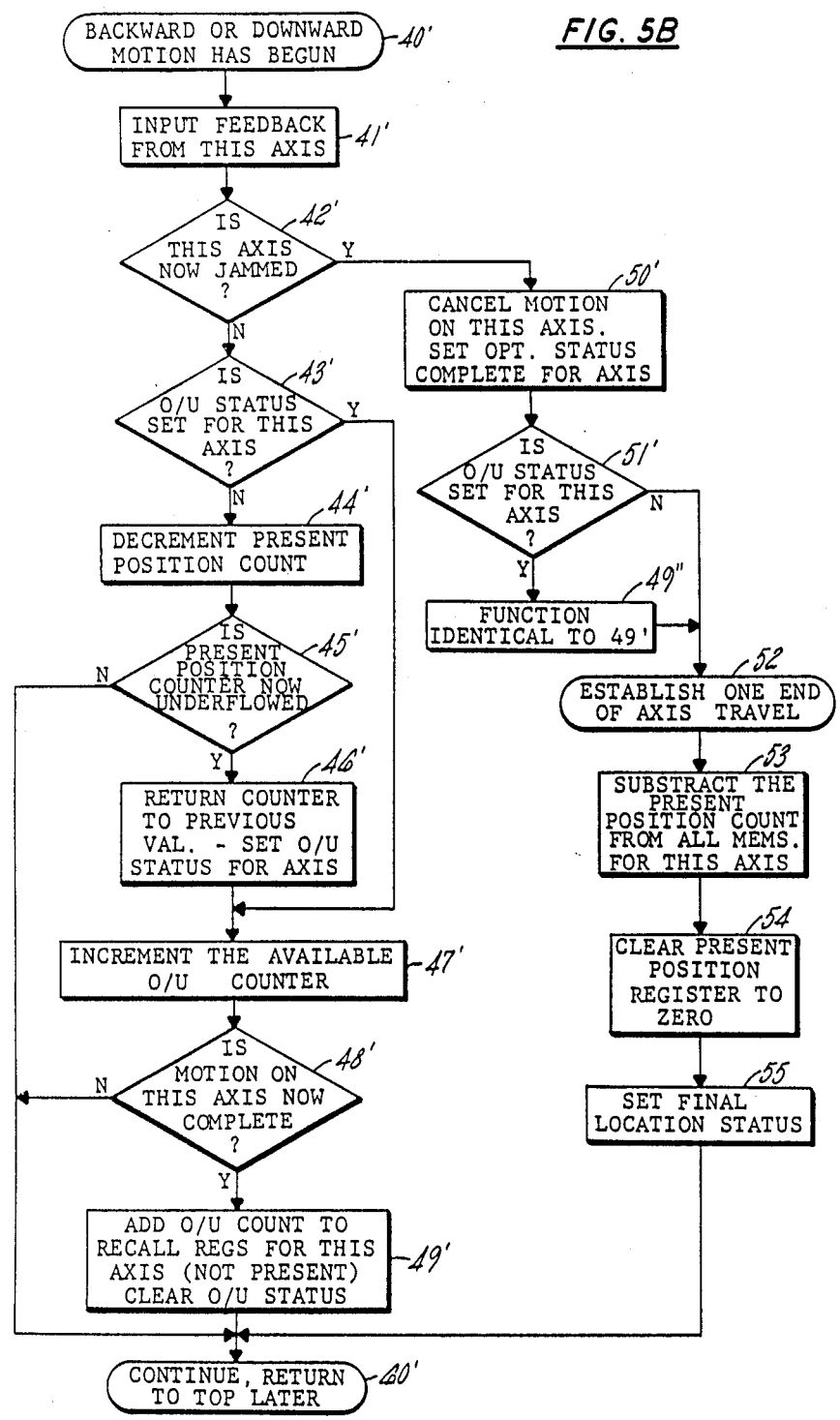

Referring to FIGS. 5A and 5B there is depicted a flow diagram of the above-described control process in which the overflow/underflow compensating means 15 comprise dedicated registers to provide that function. In FIG. 5A there is depicted a flow diagram of the steps described with respect to the earlier example in which an overflow occurred in moving the seat in a forward direction. Manually controlled forward motion of the seat begins at block 40 and digital input signals are fed back from the sensor 24a as represented by block 41. Decision block 42 asks if the axis or path is jammed, as would occur when a hard stop or limit is reached. Assuming no jam, decision block 43 asks if the overflow/underflow status has been set for that particular axis or path. That status will be set when the Present Position memory 10 arrives at an overflow limit and the program will take the "YES" branch; however assuming an overflow condition has not yet occurred, the answer is "NO" and the Present Position count of memory 10 is incremented as represented by block 44. Thereafter, block 45 asks if the Present Position counter has now overflowed with the addition of that one count. If the answer were "YES", the Present Position counter 10 would be returned to its previous value, as represented by block 46, and the overflow/underflow status flag would be set for that path or axis. Assuming the present position counter is not overflowed, however, the routine branches to the bottom where it "continues" by temporarily exiting and subsequently returning to the top of the flow diagram, as represented by function block 60. Assuming the Present Position counter had overflowed and the status flag were then set, the allocated overflow compensating register 15 is incremented as represented by the block 60. Decision block 48 asks whether the motion on that axis or along that path is then complete and if not, the routine continues via function block 47. If motion is complete, the total overflow count stored in the compensating register 15 is subtraced from the Recall #1 and #2 memories 12 and 14 for the associated axis, as represented by block 49, and the overflow/underflow status flag is cleared.

Had a limit or jam occurred at decision block 42, the routine would have branched to control block 50, whereupon motion on that axis would have been terminated and a flag would have been set, indicating completion of motion on that axis in that direction. An overflow/underflow status word exists, with respective bits of the word being representative of respective axes of motion. By looking at that word, the system is able to determine which axis, or axes, are using the register(s) represented as 33 in FIG. 4. The decision block 51 then inquires whether the overflow/underflow status bit is set for that axis and if it is, the count accumulated in compensating register 15 is subtracted from the Recall memories as represented by function block 49, otherwise, the program branches through function block 60 to return later to the beginning of the routine.

The functions and flow routine of FIG. 5B are substantially the same as those of FIG. 5A, but in reverse, and thus have been identified with correspondingly primed reference numerals. Reversals of function occur at block 40, where the motion is noted to be backward or downward; at block 44, where the Present Position count is decremented; at decision block 45, where a potential condition of underflow is monitored; and at block 49, where the count accumulated in the overflow/underflow compensating register 15 is added to the Recall registers.

Further, the flow diagram of FIG. 5B is depicted as including a further routine resulting from a "NO" decision at block 51, This additional routine, which includes function blocks 52, 53, 54 and 55 might alternatively have been included in the routine of FIG. 5A. If the overflow/underflow status bit had not been set at decision block 51,, then block 52 recognizes the jamming of motion at 42, and the cancellation of further motion at 50, as establishing a respective end of the axis or path along which the seat driving mechanism travels. This would serve as positive establishment of a known position along the axis of travel and might thereafter be used as a known reference. Block 53 indicates that the count stored in the Present Position memory 10 is subtracted from all of the Recall memories for the associated axis or path. The count presently existing in the Present Position memory 10 is then cleared and set to zero. Thereafter, block 55 sets the Final Location Status, which indicates that the particular limit representing an absolute position has been reached and identified, thus allowing the setting of so-called "soft stop" flags near the limit. In this way the limit or origin of a path of travel may be positively determined such that the count in the Present Position memory 10 is thereafter precisely indicative of the actual position of the seat. On the other hand, this separation or relative difference between the positions of the Recall #1 and #2 memory locations on that axis are preserved. The establishment of the known end of axis or path travel is particularly useful in the backward and downward direction if an "Ease of Entry" function is to be provided. With that capability, the operator may automatically command the seat, by brief actuation of the EASE switch, to move to a "back" and "down" position represented by the soft stops near the respective limits of those paths of travel for ease of entering the vehicle. Those soft stops are selected to be several counts removed from the absolute limit, and their subsequent attainment is detected by monitoring the count in the Present Position memory 10. Thus the Ease of Entry position is identified in subsequent operation simply by directly monitoring the count in Present Position memory 10, and there is no need for an additional memory.

Had there been a "YES" answer at decision block 51, the routing would have branched to a function 49"identical to 49, but which thereafter went to block 52, as had earlier occurred for a "NO" decision.

Figure 6B:
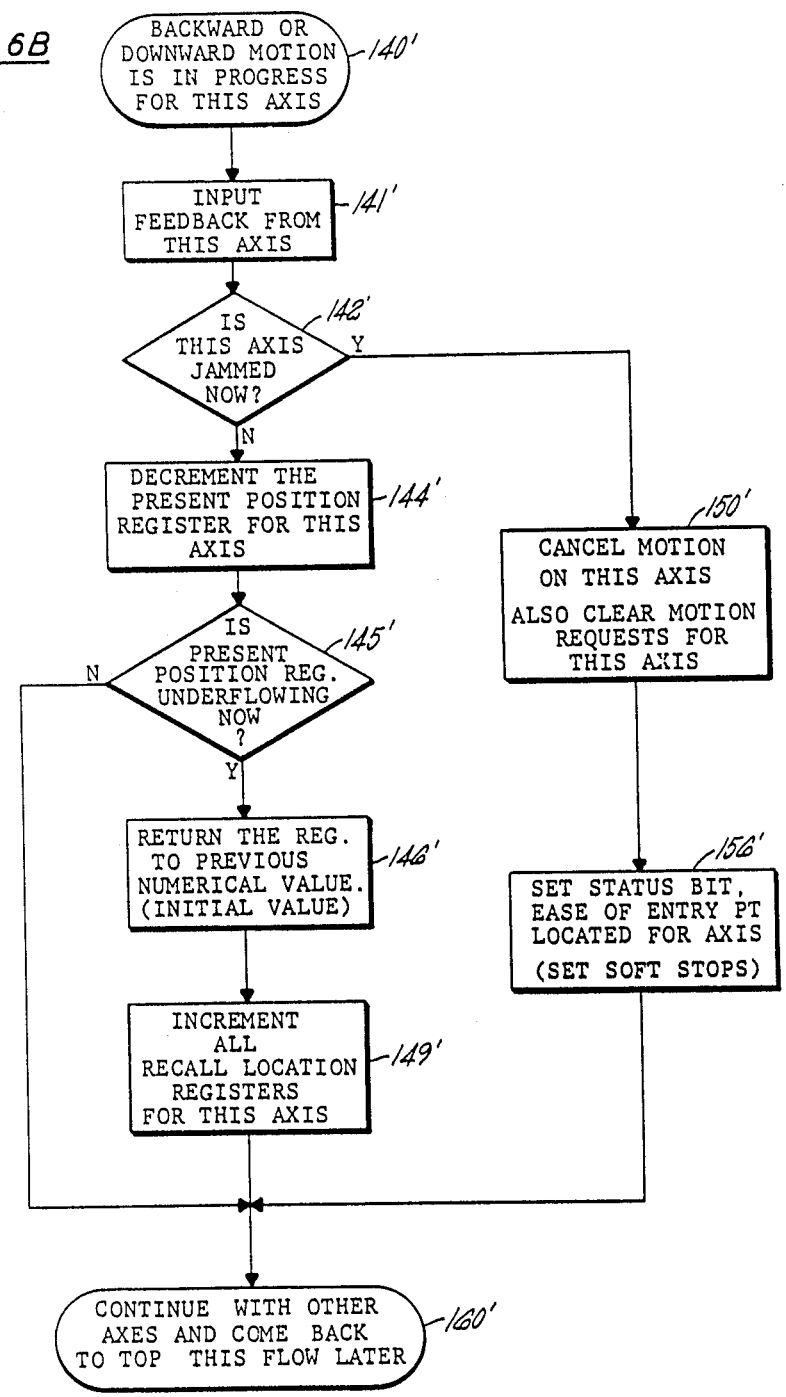

FIGS. 6A and 6B depict the flow diagram associated with the firmware for an alternate embodiment to that of FIGS. 5A and 5B. More particularly, the embodiment of FIGS. 6A and 6B do not require the overflow-/underflow register 33 of FIG. 4, as was required by the embodiment of FIGS. 5A and 5B. Rather, the compensation for overflow/underflow is provided on a real time basis via the firmware of the control system. Most of the blocks designated in the flow diagrams of FIGS. 6A and 6B are functionally equivalent to corresponding blocks in the embodiment depicted in FIGS. 5A and 5B. Accordingly, that similarity will be reflected by the identicality of the second two digits in the reference numeral, with the first digit being designated a "1" to distinguish the two embodiments.

Referring to FIG. 6A, the functions of blocks 140, 141 and 142 are the same as for blocks 40, 41 and 42 of FIG. 5A. Assuming the axis is not jammed at decision block 142, the Present Position memory for the respective axis is incremented at 144. At 145 the decision block determines whether such incrementing causes the present position memory to now overflow. If the answer is "NO", the routine exits through the continue block 160 and returns at a later time to the beginning block 140 for repetition. If the answer at 145 were "YES", the Present Position register is returned to or retained at its previous numerical value as represented in block 160. That value will be the maximum for that particular axis. Then, as a result of the determination of overflow by decision block 145, the block 149 effects a one-count decrementing of all of the recall memories, i.e., Recall #1 and Recall #2, associated with that particular axis or path. The routine then exits through block 147. If at decision block 142 the motion had been stopped by an apparent jam, the routine branches to function block 150 which cancels further motion of the seat displacing mechanism along that axis and serves to clear any further request for motion in that direction along the particular axis.

FIG. 6B depicts the flow routine for displacement of the seat drive mechanism in the backward or downward direction. Accordingly, blocks 140,, 141, and 142, correspond with blocks 40,, 41, and 42, of FIG. 5B. So long as the motion of the seat drive mechanism is permitted and is not perceived to be jammed, the count of the Present Position memory 10 is decremented for the appropriate axis at block 144, Decision block 145, then determines whether such decrementation caused the Present Position memory to overflow and if it did not, then the routine is exited via block 160, and a return is made later in the control sequence to the start at 140, On the other hand, if a condition of underflow was detected at 145,, the count of the Present Position memory is returned to or retained at its previous value. At the same time, the count in each of the Recall #1 and Recall #2 locations for the respective axis is incremented by "1", as represented by block 149, In the event the mechanism is jammed, as determined at block 142,, the routine branches to block 150, which cancels further motion in that direction along that axis. In addition to that action, the function block 156 cumulatively represents the functions of blocks 52-55 in FIG. 5B. Specifically, since a limit has been reached in the backward or downward direction, it is presumed to be at the origin of the respective axes. From that determination, the "soft stops" may be set for the Ease of Entry function. Also, by setting "soft stops" near either end of the travel path, the drive mechanism may be stopped and further motion cancelled when it arrives at a respective "soft stop", thereby avoiding damage to the drive mechanism occasioned by successive hard stops.

As with the embodiment of FIGS. 5A and 5B, the determination of jammed motion has been depicted as providing an indication of a limit along the respective axis only in the backward and downward direction. However, it will be understood that such determination in the forward or upward direction might also establish a limit at the opposite end of the axis. This latter possibility is unlikely to be applied in the situation in which an Ease of Entry function exists, since it will be essential to establish the backward and downward limit position early in the operation of the device. Moreover, unless the precise number of counts between one end and the other end of a particular axis or travel path is precisely repeatable from vehicle to vehicle, it would be generally undesirable to identify hard limits at both ends of an axis and then presume that there are a precise number of intermediate counts therebetween which are the same from vehicle to vehicle.

It will be understood that the character of the invention and its description to this point have been concerned with the establishment of values in the Present Position and Recall memories which preserve the accuracy of their relationship even if the initial position of the seat is only presumed. It will be further appreciated that each time the Present Position memory 10 for a respective axis undergoes an overflow or underflow condition, the resulting relative adjustment of the data in the Recall memories is closer to the actual position than was previously the case. At the extreme of such situation, the seat mechanism encounters one of the end limits of a respective travel path, and the resulting positions stored in the associated memories then correspond with actual positions.

The performance of the control system for automatically moving a seat to a Recall #1, a Recall #2, or an Ease of Entry position thereafter occurs in a relatively well known manner upon actuation of the appropriate control switch. Specifically, the controller 20 operates to compare the count in a Present Position memory 10 with that of the selected Recall #1, Recall #2 or Ease of Entry position value and utilizes the sense (positive or negative) of any difference therebetween to drive the seat in an appropriate direction until the difference is zero. This may occur in a technique of successive approximations, as disclosed in the aforementioned U.S. Pat. No. 4,706,194, or it may be pursued in a continuous manner so long as any difference exists.

Although this invention has been shown and described with respect to detailed embodiments thereof, it will be understood by those skilled in the art that various changes in form and detail thereof may be made without departing from the spirit and scope of the claimed invention.

Having thus described a typical embodiment of the invention, that which is claimed as new and desired to secure by Letters Patent of the United States is:

1. In an apparatus for controlling the position of a vehicle seat within a powered seat mechanism, the apparatus including a reversible motor operative to drive the seat in either of two opposite directions within a travel path of limited extent, means for producing digital signals during operation of the motor representative of the position of the seat within said travel path, logic and signal storage means including first and second memories, said first memory being receptive of said digital signals for storing therein data representative of the present position of the seat within said travel path, manually selective position control means for setting said second memory to store data representative of a recall position within said travel path for said seat, position recall means manually actuable to signal said logic and storage means to initiate operation of the motor to drive said seat toward the recall position, said signals producing means being operative during operation of said motor to produce signals for transmission to said signal storage means to control the drive of the seat to the recall position, the improvement comprising:

said signal storage means being of limited capacity, said first memory being of less capacity than is required for storing 2N digital signals, wherein N is equal to the number of digital signals produced during the drive of the seat through the extent of the travel path in one direction; and compensating means responsive to said first memory reaching said capacity limit for appropriately decrementing or incrementing said data representative of a recall position for maintaining an accurate relation between the data respectively representative of said present position and said recall position of said seat.

2. The apparatus of claim 1 wherein said compensating means comprises overflow/underflow register means for accumulating a respective count of said digital signals which exceed the respective overflow or underflow capacity limit of said first memory, and means for respectively decrementing or incrementing the recall position data by the count accumulated by said overflow/underflow register means.

3. The apparatus of claim 1 wherein said compensating means comprises said logic means being responsive to said first memory attaining said capacity limit for respectively successively decrementing the recall position data for each count by which subsequent said digital signals overflow said capacity limit or successively incrementing the recall position data for each count by which subsequent said digital signals underflow said capacity limit.

4. The apparatus of claim 3 wherein said signal storage means further includes a third memory, said second and third memories being for first and second recall position data respectively, said first and second recall position data being respectively associated with first and second personal preference positions, both said first recall position data and said second recall position data being decremented or incremented for each count by which said digital signals respectively overflow or underflow said capacity limit of said first memory.

5. The apparatus of claim 4 including means for automatically initializing said signal storage means for said present position data and for said recall position data at their respective numeric center positions upon power-up of said logic and signal storage means.

6. The apparatus of claim 1 including means for automatically initializing said signal storage means for said present position data and for said recall position data at their respective numeric center positions upon power-up of said logic and signal storage means.

7. The apparatus of claim 1 wherein the capacity of said second memory is also less than required for storing 2N digital signals.

8. The apparatus of claim 4 wherein the capacity of each of said second and said third memories is also less than required for storing 2N digital signals.

9. The apparatus of claim 7 wherein said first and said second memories each have a capacity for storing about 1.25N digital signals.

* * * * *